United States Patent
Ito et al.

(10) Patent No.: US 11,069,912 B2
(45) Date of Patent: Jul. 20, 2021

(54) FUEL CELL SYSTEM

(71) Applicant: TOYOTA JIDOSHA KABUSHIKI KAISHA, Toyota (JP)

(72) Inventors: Masayuki Ito, Sunto-gun (JP); Tomohiko Kaneko, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 137 days.

(21) Appl. No.: 16/564,593

(22) Filed: Sep. 9, 2019

(65) Prior Publication Data
US 2020/0136157 A1 Apr. 30, 2020

(30) Foreign Application Priority Data

Oct. 30, 2018 (JP) .............................. JP2018-204244

(51) Int. Cl.
| | |
|---|---|
| *H01M 8/04858* | (2016.01) |
| *H01M 8/04007* | (2016.01) |
| *H01M 8/04082* | (2016.01) |
| *H01M 8/04111* | (2016.01) |
| *H01M 8/04119* | (2016.01) |
| *H01M 8/04701* | (2016.01) |
| *H01M 8/04746* | (2016.01) |
| *H01M 8/249* | (2016.01) |

(52) U.S. Cl.
CPC ..... *H01M 8/0488* (2013.01); *H01M 8/04067* (2013.01); *H01M 8/04111* (2013.01); *H01M 8/04126* (2013.01); *H01M 8/04201* (2013.01); *H01M 8/04723* (2013.01); *H01M 8/04753* (2013.01); *H01M 8/249* (2013.01)

(58) Field of Classification Search
CPC ............... H01M 8/0488; H01M 8/249; H01M 8/04126; H01M 8/04753; H01M 8/04111; H01M 8/04067; H01M 8/04723; H01M 8/04201; H01M 8/04604; H01M 8/0491; H01M 8/04223; H01M 8/04141; H01M 8/04149; H01M 8/04768; H01M 8/04291; H01M 8/04298; H01M 8/06; H01M 8/2465; H01M 2250/20; H01M 2008/1095

See application file for complete search history.

(56) References Cited

U.S. PATENT DOCUMENTS

2010/0136377 A1* 6/2010 Park .................... H01M 8/0488
429/454
2015/0125772 A1* 5/2015 Matsusue ........... H01M 8/04611
429/432

FOREIGN PATENT DOCUMENTS

| JP | 63-26961 | 4/1988 |
|---|---|---|
| JP | 2009-059610 | 3/2009 |
| JP | 2012185968 | * 9/2012 |

* cited by examiner

*Primary Examiner* — Ula C Ruddock
*Assistant Examiner* — Matthew W Van Oudenaren
(74) *Attorney, Agent, or Firm* — Finnegan, Henderson, Farabow, Garrett & Dunner, LLP

(57) ABSTRACT

A fuel cell system includes: a first fuel cell stack and a second fuel cell stack; a supply passage connected to an inlet of oxidant gas in the first fuel cell stack; an discharge passage connected to an outlet of the oxidant gas in the second fuel cell stack; introduction unit that introduces water in the oxidant gas flowing through the discharge passage into the supply passage; and a controller configured to perform refresh control of the first fuel cell stack by lowering voltage of the first fuel cell stack, and operates, during the refresh control, the introduction unit while keeping the second fuel cell stack in an electric power generation state.

8 Claims, 7 Drawing Sheets

FUEL CELL SYSTEM

INCORPORATION BY REFERENCE

The disclosure of Japanese Patent Application No. 2018-204244 filed on Oct. 30, 2018 including the specification, drawings and abstract is incorporated herein by reference in its entirety.

BACKGROUND

1. Technical Field

The present disclosure relates to a fuel cell system.

2. Description of Related Art

In fuel cells, a platinum catalyst adopted as an electrode oxidizes with the passage of time, and oxide films accumulate on the surface of the platinum catalyst. In addition to the oxide film, impurities, such as sulfonic acid, adhere to the surface of the platinum catalyst. Hence, there are possibilities that power generation performance of the fuel cells deteriorates due to the oxide films and the impurities.

As a solution, there is means for recovering the power generation performance of the fuel cells, the means being configured to temporarily lower cell voltage of the fuel cells so as to reduce the oxide films and desorb the impurities from the platinum catalyst (see, for example, Japanese Patent Application Publication No. 2009-59610 (JP 2009-59610 A)). Such control for temporarily lowering the cell voltage for recovery of the power generation performance is stated as "refresh control" in the following descriptions.

SUMMARY

During refresh control, the oxide films are reduced into oxygen gas through reduction reaction, and are discharged from the fuel cells together with off-gas. However, since the impurities are desorbed from the platinum catalyst as solids, it is difficult to sufficiently wash away and discharge the impurities by liquid water if the amount of liquid water contained in the fuel cells is small. In the case where the impurities remain in the fuel cells after the refresh control, the impurities may adhere to the surface of the platinum catalyst again, when the cell voltage is returned to a value used for normal electric power generation, and this may cause insufficient recovery of the power generation performance.

For example, in a fuel cell system including a plurality of fuel cell stacks, the entire power generation performance may largely deteriorate, when recovery of the power generation performance in each fuel cell stack is insufficient.

The present disclosure provides a fuel cell system capable of facilitating discharge of impurities at the time of refresh control.

A first aspect of the present disclosure relates to a fuel cell system. The fuel cell system includes: a first fuel cell stack and a second fuel cell stack; a supply passage; discharge passages; an introduction unit; and a controller. The first fuel cell stack and the second fuel cell stack are each configured to generate electric power through chemical reaction between fuel gas and oxidant gas. The supply passage is connected to an inlet of the oxidant gas in the first fuel cell stack. The discharge passages are connected to an outlet of the oxidant gas in the second fuel cell stack. The introduction unit is configured to introduce water in the oxidant gas flowing through the discharge passage into the supply passage. The controller is configured to perform refresh control of the first fuel cell stack by lowering voltage of the first fuel cell stack, and operate, during the refresh control, the introduction unit while keeping the second fuel cell stack in an electric power generation state.

When performing the refresh control, the controller may be configured to lower the voltage of the first fuel cell stack by setting a flow rate of the oxidant gas flowing through the supply passage to be lower than the flow rate of the oxidant gas in a case of making the first fuel cell stack generate the electric power in accordance with electric power requested to the first fuel cell stack and the second fuel cell stack.

The introduction unit may include a humidifier including a film configured to permit the water to permeate from a discharge passage side to a supply passage side.

The introduction unit may include a first control valve configured to connect the humidifier to the discharge passage. The controller may be configured to control an opening degree of the first control valve such that at least some of the oxidant gas flowing through the discharge passage flows to the humidifier during the refresh control.

The introduction unit may include a second control valve configured to connect the supply passage to the humidifier. The controller may be configured to control an opening degree of the second control valve such that at least some of the oxidant gas flowing through the supply passage flows to the humidifier during the refresh control.

The introduction unit may include a pump configured to pump out the oxidant gas flowing through the discharge passage to the supply passage. The controller may be configured to drive the pump during the refresh control.

The fuel cell system may include an air compressor configured to supply the oxidant gas to the first fuel cell stack, the air compressor being provided on an upstream side of the introduction unit in the supply passage. The controller may be configured to stop operation of the air compressor during the refresh control.

The fuel cell system may include a cooling device configured to supply to the first fuel cell stack a cooling medium configured to cool the first fuel cell stack. The controller may be configured to control the cooling device so as to increase a supply amount of the cooling medium, or so as to lower temperature of the cooling medium during the refresh control.

The present disclosure can facilitate discharge of impurities during refresh control.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Configuration of Fuel Cell System of First Embodiment

Figure 1:
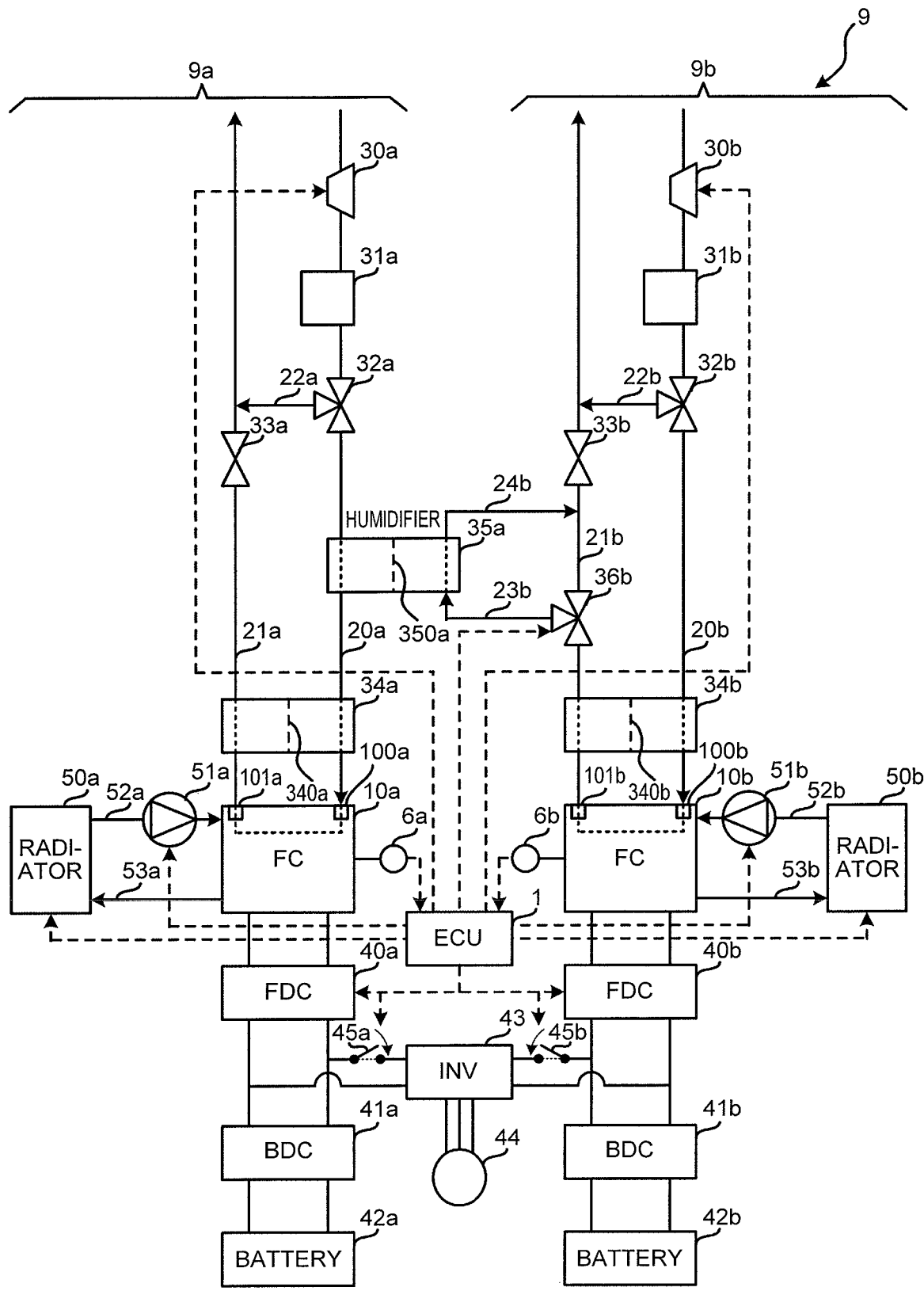
FIG. 1 is a block diagram showing a fuel cell system of a first embodiment.

FIG. 1 is a block diagram showing a fuel cell system 9 of a first embodiment. For example, the fuel cell system 9 is mounted on a fuel-cell vehicle. The fuel cell system 9 includes a first electric power generation system 9a, a second electric power generation system 9b, an ECU 1, an inverter (INV) 43, a motor 44, and switches 45a, 45b.

The first electric power generation system 9a includes a fuel cell stack 10a, a voltage sensor 6a, a cathode supply passage 20a, a cathode discharge passage 21a, a bypass passage 22a, an air compressor 30a, an intercooler 31a, a three-way valve 32a, a backpressure valve 33a, and humidifiers 34a, 35a. The first electric power generation system 9a further includes a direct current (DC)-DC converter (FDC) 40a for the fuel cell stack 10a, a battery 42a, a DC-DC converter (BDC) 41a for the battery 42a, a radiator 50a, a cooling pump 51a, a coolant supply passage 52a, and a coolant discharge passage 53a.

The second electric power generation system 9b includes a fuel cell stack 10b, a voltage sensor 6b, a cathode supply passage 20b, a cathode discharge passage 21b, a bypass passage 22b, humidification passages 23b, 24b, an air compressor 30b, an intercooler 31b, three-way valves 32b, 36b, a backpressure valve 33b, and a humidifier 34b. The second electric power generation system 9b further includes a DC-DC converter (FDC) 40b for the fuel cell stack 10b, a battery 42b, a DC-DC converter (BDC) 41b for the battery 42b, a radiator 50b, a cooling pump 51b, a coolant supply passage 52b, and a coolant discharge passage 53b.

The cathode supply passages 20a, 20b are pipelines which carry oxidant gas supplied to the fuel cell stacks 10a, 10b. The cathode discharge passages 21a, 21b are pipelines which carry oxidant off-gas discharged from the fuel cell stacks 10a, 10b. The cathode supply passage 20a is an example of the supply passage, and the cathode discharge passage 21b is an example of the discharge passage.

The bypass passage 22a has one end connected to the cathode supply passage 20a by the three-way valve 32a, and the other end connected to the cathode discharge passage 21a. The bypass passage 22b has one end connected to the cathode supply passage 20b by the three-way valve 32b, and the other end connected to the cathode discharge passage 21b. Hence, some of the oxidant gas flows from the cathode supply passages 20a, 20b to the cathode discharge passages 21a, 21b through the bypass passages 22a, 22b in accordance with opening degrees of the three-way valves 32a, 32b on the side of the bypass passages 22a, 22b.

Although illustration is omitted, the first electric power generation system 9a and the second electric power generation system 9b have anode supply passages as pipelines which carry the fuel gas supplied to the fuel cell stacks 10a, 10b, and anode discharge passages as pipelines which carry the fuel off-gas discharged from the fuel cell stacks 10a, 10b. In one example, the fuel gas is hydrogen gas, and the oxidant gas is air.

The fuel cell stacks 10a, 10b are stacked bodies including a plurality of solid polymer fuel cells (single cells). The fuel gas and the oxidant gas are supplied to each of the fuel cells through manifolds. The fuel cells are each provided with a membrane electrode assembly (MEA) including a pair of electrodes and an electrolyte membrane, the electrodes each including a platinum catalyst. The fuel cells generate electric power by electrochemical reaction between oxygen in oxidant gas and hydrogen in fuel gas in the membrane electrode assembly. The fuel cells generate water together with electric power.

The oxidant gas is supplied from the cathode supply passages 20a, 20b to the fuel cell stacks 10a, 10b, and used for electric power generation. The oxidant gas is also discharged from the fuel cell stacks 10a, 10b to the cathode discharge passages 21a, 21b as oxidant off-gas. The cathode supply passages 20a, 20b are connected to oxidant gas supply manifolds 100a, 100b which are inlets of the oxidant gas in the fuel cell stacks 10a, 10b, respectively. The cathode discharge passages 21a, 21b are connected to oxidant gas discharge manifolds 101a, 101b which are outlets of the oxidant gas in the fuel cell stacks 10a, 10b, respectively.

Along the direction from an upstream side to a downstream side, the cathode supply passages 20a, 20b are connected to the air compressors 30a, 30b, the intercoolers 31a, 31b, the three-way valves 32a, 32b, and the humidifiers 34a, 34b, respectively.

The air compressors 30a, 30b supply oxidant gas to the fuel cell stacks 10a, 10b through the cathode supply passages 20a, 20b. The air compressors 30a, 30b are provided on the upstream side of the three-way valves 32a, 32b and the intercoolers 31a, 31b in the cathode supply passages 20a, 20b.

The air compressors 30a, 30b take in and compress oxidant gas from the outside. The compressed oxidant gas is sent to the intercoolers 31a, 31b. The ECU 1 controls the air compressors 30a, 30b. The intercoolers 31a, 31b cool the oxidant gas warmed by compression. The cooled oxidant gas is sent to the three-way valves 32a, 32b.

Some of the oxidant gas flows from the three-way valves 32a, 32b to the bypass passages 22a, 22b, and is discharged from the cathode discharge passages 21a, 21b. The remaining oxidant gas flows through the cathode supply passages 20a, 20b up to the humidifiers 34a, 34b. The humidifiers 34a, 34b humidify the oxidant gas with the water contained in the oxidant off-gas which flows through the cathode discharge passages 21a, 21b.

The humidifier 35a is further connected to a portion of the cathode supply passage 20a of the first electric power generation system 9a, the portion being located on the downstream side of the three-way valve 32a and the upstream side of the humidifier 34a. The humidifier 35a humidifies the oxidant gas with the water introduced from the cathode discharge passage 21b of the second electric power generation system 9b.

The humidifiers 34a, 34b, 35a are configured such that at least some of the oxidant off-gas, relatively high in humidity, flowing through the cathode discharge passages 21a, 21b pass through one side of films 340a, 340b, 350a which are made of a hollow filament, for example. The humidifiers 34a, 34b, 35a are also configured such that at least some of the oxidant gas, relatively low in humidity, flowing through the cathode supply passages 20a, 20b pass through the other side of the films 340a, 340b, 350a. Thus, the humidifiers 34a, 34b, 35a humidify the oxidant gas by permitting the water penetrate the films 340a, 340b, 350a. However, the humidifying process is not limited to this, and other humidifying processes may be adopted.

The cathode discharge passages 21a, 21b are connected to the humidifiers 34a, 34b and the backpressure valves 33a, 33b. The humidifiers 34a, 34b extract water from the oxidant off-gas flowing through the cathode discharge passages 21a, 21b, and use the water for humidifying the oxidant gas. The backpressure valves 33a, 33b regulate the backpressure of the oxidant off-gas.

The three-way valve 36b is connected to a portion of the cathode discharge passage 21b in the second electric power generation system 9b, the portion being located on the downstream side of the humidifier 34b and the upstream side of the backpressure valve 33b. The three-way valve 36b is also connected to a humidification passage 23b which is connected to the humidifier 35a. The ECU 1 controls an opening degree of the three-way valve 36b on the humidification passage 23b side.

At least some of the oxidant off-gas flowing through the cathode discharge passage 21b flows through the humidification passage 23b in accordance with the opening degree of the three-way valve 36b on the humidification passage 23b side, and is guided to the humidifier 35a. In the humidifier 35a, water in the oxidant off-gas permeates the film 350a, and moves to the cathode supply passage 20a. The oxidant off-gas used for humidification in the humidifier 35a flows through the humidification passage 24b, and returns to the cathode discharge passage 21b. The humidifier 35a, the three-way valve 36b, and the humidification passages 23b, 24b are examples of the introduction unit which introduces the water, contained in the oxidant gas flowing through the cathode discharge passage 21b, into the cathode supply passage 20a. The three-way valve 36b is an example of the first control valve.

The radiators 50a, 50b and the cooling pumps 51a, 51b are examples of the cooling device, which supplies coolant to the fuel cell stacks 10a, 10b. The coolant is an example of the cooling medium which cools the fuel cell stacks 10a, 10b.

The radiators 50a, 50b are connected with the fuel cell stacks 10a, 10b through the coolant supply passages 52a, 52b and the coolant discharge passages 53a, 53b which carry the coolant. The coolant flows from the radiators 50a, 50b to the fuel cell stacks 10a, 10b through the coolant supply passages 52a, 52b.

Although the fuel cell stacks 10a, 10b generate heat by electric power generation, temperature increase thereby is restrained by cooling by the coolant. The coolant used for cooling returns from the fuel cell stacks 10a, 10b to the radiators 50a, 50b through the coolant discharge passages 53a, 53b.

The coolant supply passages 52a, 52b are equipped with the cooling pumps 51a, 51b. The cooling pumps 51a, 51b pump out the coolant to the fuel cell stacks 10a, 10b. Thus, the coolant circulates between the fuel cell stacks 10a, 10b and the radiators 50a, 50b. The ECU 1 controls operation of the radiators 50a, 50b and the cooling pumps 51a, 51b.

The DC-DC converters 40a, 40b include switching elements, such as transistors, to boost the output voltage of the fuel cell stacks 10a, 10b by switching control of the switching elements. The ECU 1 controls boosting operation of the DC-DC converters 40a, 40b. The inverter 43 includes components such as a transformer and a transistor to convert an output current of the fuel cell stacks 10a, 10b from direct current into alternating current. The inverter 43 is connected to the motor 44 which drives the wheels (not illustrated) of the fuel-cell vehicle. The motor 44 rotates with alternating current.

The inverter 43 is connected with the DC-DC converters 40a, 40b, 41a, 41b through the switches 45a, 45b. The ECU 1 controls on-off of the switches 45a, 45b. With this control, the switch 45a electrically connects or disconnects the fuel cell stack 10a, the battery 42a, and the inverter 43, while the switch 45b electrically connects or disconnects the fuel cell stack 10b, the battery 42b, and the inverter 43.

In the present embodiment, the fuel cell system is configured such that the DC-DC converters 40a, 40b, 41a, 41b, and the switches 45a, 45b are independently provided. However, the present disclosure is not limited to the configuration disclosed. For example, the fuel cell system may be configured with only the DC-DC converters 40a, 40b, 41a, 41b. With use of the switching elements inside the DC-DC converters 40a, 40b, 41a, 41b, the fuel cell stacks 10a, 10b, the batteries 42a, 42b, and the inverter 43 may electrically be connected or disconnected.

The batteries 42a, 42b store an excessive portion of the electric power of the fuel cell stacks 10a, 10b. The DC-DC converters 41a, 41b include switching elements, such as transistors, to boost the output voltage of the batteries 42a, 42b by switching control of the switching elements. The electric power of the batteries 42a, 42b is supplied to the motor 44 through the inverter 43, for example.

The voltage sensors 6a, 6b detect cell voltages of the fuel cell stacks 10a, 10b. The voltage sensors 6a, 6b may be provided for every single cell in the fuel cell stacks 10a, 10b, or may be provided only in any one single cell.

The ECU 1 is an example of the controller, which controls operation of the fuel cell system 9. The ECU 1 includes a central processing unit (CPU), and a memory which stores a program for driving the CPU and various kinds of data, for example.

The ECU 1 controls the DC-DC converters 40a, 40b in order to regulate output currents of the fuel cell stacks 10a, 10b. The regulation means of the output currents is not limited to control of the DC-DC converters 40a, 40b. For example, the output currents are also changed by control of electric loads of the fuel cell stacks 10a, 10b, for example.

The ECU 1 controls the air compressors 30a, 30b in order to regulate the flow rate of the oxidant gas to be supplied. The ECU 1 controls the air compressors 30a, 30b in order to regulate the flow rate of oxidant gas required to obtain output currents. Similarly, the ECU 1 controls an unillustrated injector in order to regulate the flow rate of fuel gas required to obtain the output currents.

The ECU 1 also controls at least either the radiators 50a, 50b or the cooling pumps 51a, 51b in order to regulate the temperature of the fuel cell stacks 10a, 10b. For example, when the radiators 50a, 50b include fans, the ECU 1 controls the speed of the fans to change the temperature of the coolant, and thereby regulates the temperature of the fuel cell stacks 10a, 10b. The ECU 1 also controls, for example, the output of the cooling pumps 51a, 51b to change the supply amount of the coolant, and thereby regulates the temperature of the fuel cell stacks 10a, 10b.

In the present embodiment, there is assume the case where electric power generation performance is deteriorated due to oxidation of a platinum catalyst of the fuel cells and due to adhesion of impurities to the catalyst surface in the fuel cell stack 10a of the first electric power generation system 9a. The ECU 1 performs refresh control of the fuel cell stack 10a by lowering the output voltage of the fuel cell stack 10a to a prescribed value or less for the purpose of recovering the electric power generation performance of the fuel cell stack 10a.

For example, the ECU 1 controls the DC-DC converter 40a so as to increase the output current of the fuel cell stack 10a, while maintaining the flow rates of fuel gas and oxidant gas required for normal electric power generation in the fuel cell stack 10a. As the output current of the fuel cell stack 10a increases, the output voltage of the fuel cell stack 10a lowers in accordance with change characteristics of the voltage relative to the electric current of the fuel cells. Thus, in the fuel cell stack 10a, the cell voltages of the fuel cells become temporarily lower than a lower limit value that is required for refresh control. As a result, the electric power generation performance of the fuel cell stack 10a is recovered.

The ECU 1 may lower the cell voltages by decreasing the flow rate of the oxidant gas supplied to the fuel cell stack 10a, while sweeping a prescribed output current from the fuel cell stack 10a. As the flow rate of oxidant gas decreases, the cell voltages lower. For example, the ECU 1 decreases the flow rate of the oxidant gas in the cathode supply passage 20a by lowering the output of the air compressor 30a. As a consequence, in the fuel cell stack 10a, the cell voltages of the fuel cells become temporarily lower than a lower limit value that is required for refresh control. Hence, the electric power generation performance of the fuel cell stack 10a is recovered. Here, the prescribed output current is not necessarily a fixed electric current. When the flow rate of oxidant gas is decreased, it is generally difficult to secure the flow rate of oxidant gas required for electrochemical reaction. This leads to a failure in maintaining the required current instructed by the ECU 1, and the electric current actually generated may be lowered.

At the time of refresh control, oxide films adhering to the platinum catalyst are reduced to oxygen gas through reduction reaction, and are discharged from the fuel cells with off-gas. However, since the impurities adhering to the platinum catalyst are desorbed from the platinum catalyst as solids, it is difficult to sufficiently wash away and discharge the impurities by liquid water if the amount of liquid water in the fuel cell stack 10a is small. In the case where the impurities remain in the fuel cell stack 10a after the refresh control, the impurities may adhere to the surface of the platinum catalyst again, when the cell voltage is returned to a value used for normal electric power generation, and this may cause insufficient recovery of the power generation performance.

Accordingly, during the refresh control, the ECU 1 keeps the fuel cell stack 10b of the second electric power generation system 9b in an electric power generation state, and in this state, the ECU 1 controls the opening degree of the three-way valve 36b on the humidification passage 23b side, such that the water generated through electric power generation in the fuel cell stack 10b is introduced from the cathode discharge passage 21b of the second electric power generation system 9b, that is in the electric power generation state, to the cathode supply passage 20a of the first electric power generation system 9a. When the ECU 1 operates the three-way valve 36b, water is introduced from the cathode discharge passage 21b to the cathode supply passage 20a. As a consequence, at least some of the oxidant off-gas in the cathode discharge passage 21b is guided to the humidifier 35a.

Since the fuel cell stack 10b of the second electric power generation system 9b is in a normal power generation state and not during the refresh control, the oxidant off-gas inside the cathode discharge passage 21b sufficiently contains the water generated by electric power generation. The humidifier 35a uses the water contained in the oxidant off-gas for humidification of the oxidant gas inside the cathode supply passage 20a. As a result, the water moves into the cathode supply passage 20a.

The water introduced from the humidifier 35a flows through the cathode supply passage 20a together with the oxidant gas pumped by the air compressor 30a, and flows into the fuel cell stack 10a. Hence, the amount of water in the fuel cell stack 10a during the refresh control increases by a portion that is introduced by the humidifier 35a. Accordingly, the fuel cell stack 10a can sufficiently secure the liquid water for washing away the impurities which are desorbed from the platinum catalyst by the refresh control. Therefore, the fuel cell system 9 can facilitate discharge of impurities at the time of refresh control.

In this case, the humidifier 35a humidifies the oxidant gas flowing through the cathode supply passage 20a with the water contained in the oxidant off-gas flowing through the cathode discharge passage 21b. Hence, only the water moves from the cathode discharge passage 21b to the cathode supply passage 20a, and the oxidant off-gas does not flow into the fuel cell stack 10a. Therefore, the ECU 1 can regulate the flow rate of the oxygen supplied to the fuel cell stack 10a by the control of the air compressor 30a.

The three-way valve 36b connects the humidifier 35a to the cathode discharge passage 21b. The ECU 1 controls the opening degree of the three-way valve 36b on the humidification passage 23b side such that at least some of the oxidant off-gas flowing through the cathode discharge passage 21b flows into the humidifier 35a during the refresh control. Hence, some of the oxidant off-gas flowing through the cathode discharge passage 21b flows from the three-way valve 36b to the humidifier 35a through the humidification passage 23b, while the remaining oxidant off-gas is discharged from the three-way valve 36b and through the backpressure valve 33b along the cathode discharge passage 21b. Therefore, the ECU 1 can regulate the amount of water supplied to the fuel cell stack 10a with the opening degree of the three-way valve 36b.

Moreover, the fuel cell stack 10a preferably secures a large amount of liquid water in order to effectively wash away the impurities. Hence, the ECU 1 controls the radiator 50a or the cooling pump 51a so as to lower the temperature of the fuel cell stack 10a.

In this case, the ECU 1 may increase the supply amount of the coolant by increasing the output of the cooling pump 51a, or may lower the temperature of the coolant by increasing the speed of the fan of the radiator 50a, for example. When the temperature of the fuel cell stack 10a lowers as a consequence, the amount of saturated steam in the fuel cell stack 10a also decreases. As a result, the water tends to become liquid water more than steam. Hence, the amount of liquid water increases, which makes it possible to wash away the impurities more effectively during the refresh control.

Configuration of Fuel Cell System of Second Embodiment

In the first embodiment, the flow rate of oxidant off-gas flowing from the cathode discharge passage 21b into the humidifier 35a is regulated. Contrary to this, the flow rate of the oxidant gas flowing from the cathode supply passage 20a into the humidifier may be regulated.

Figure 2:
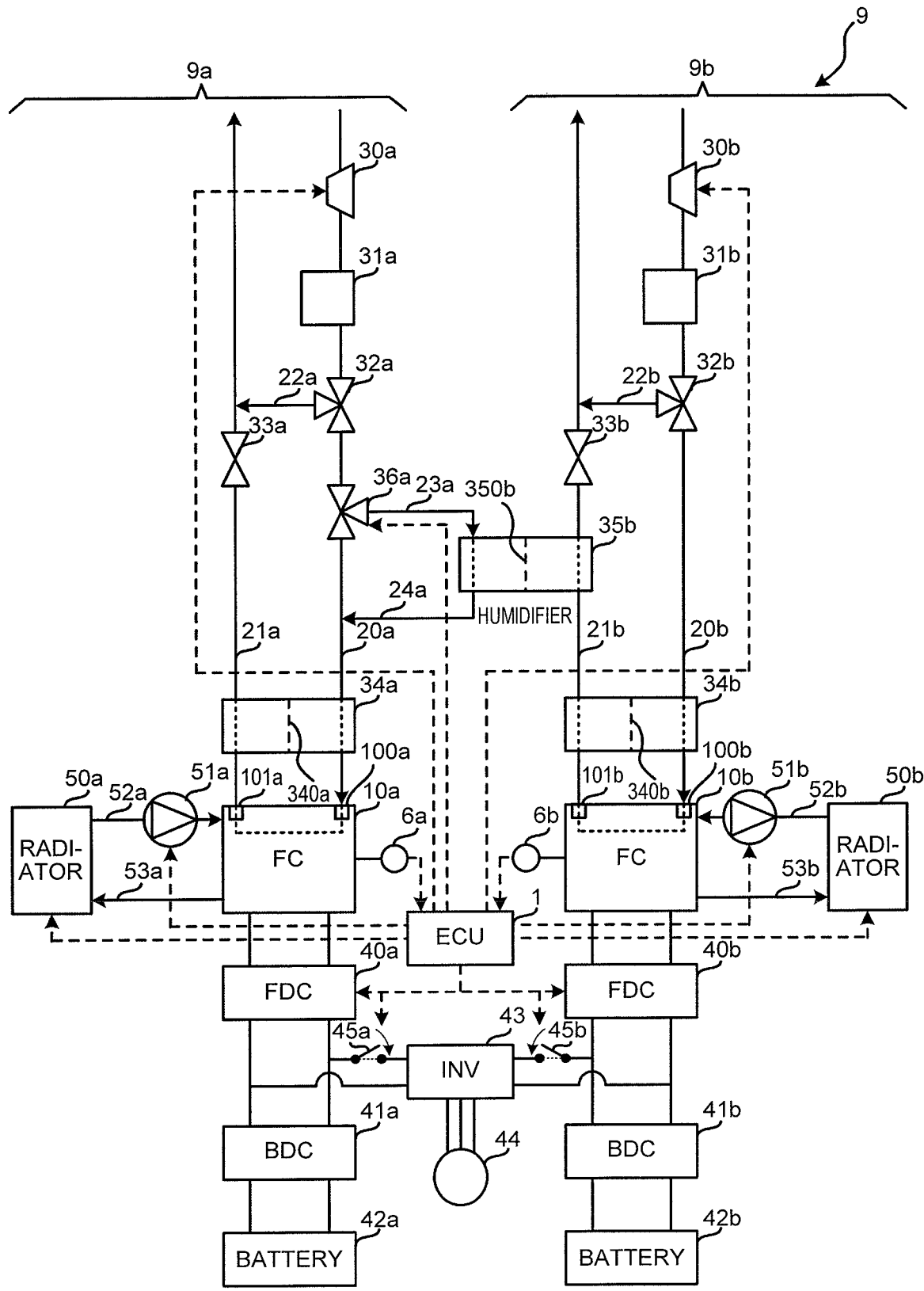
FIG. 2 is a block diagram showing the fuel cell system of a second embodiment.

FIG. 2 is a block diagram showing the fuel cell system 9 of a second embodiment. In FIG. 2, component members identical to those in FIG. 1 are designated by identical reference signs to omit the description thereof.

The fuel cell system 9 of the present example includes a humidifier 35b, a three-way valve 36a, and humidification passages 23a, 24a, instead of the humidifier 35a, the three-way valve 36b, and the humidification passages 23b, 24b in the first embodiment. The three-way valve 36a is connected to a portion of the cathode supply passage 20a, the portion being located on the downstream side of the three-way valve 32a and the upstream side of the humidifier 34a. The ECU 1 controls an opening degree of the three-way valve 36a on the humidification passage 23a side.

The humidification passage 23a has one end connected to the three-way valve 36a, and the other end connected to the humidifier 35b. The humidification passage 24a has one end connected to the cathode supply passage 20a, and the other end connected to the humidifier 35b.

At least some of the oxidant gas flowing through the cathode supply passage 20a is guided from the humidification passage 23a to the humidifier 35b in accordance with the opening degree of the three-way valve 36a on the humidification passage 23a side. The humidifier 35b is connected to the humidification passages 23a, 24a and the cathode discharge passage 21b. The humidifier 35b humidifies the oxidant gas flowing from the humidification passage 23a with the water contained in the oxidant off-gas flowing through the cathode discharge passage 21b. The humidifier 35b performs humidification by moving the water via, for example, a hollow filament or a film. However, without being limited to this, humidification may be performed with other humidification processes. The humidified oxidant gas flows through the humidification passage 24a, and returns to the cathode supply passage 20a.

Thus, as in the first embodiment, the water in the cathode discharge passage 21b is introduced into the cathode supply passage 20a through the humidifier 35b, and is supplied to the fuel cell stack 10a. The humidifier 35b, the three-way valve 36a, and the humidification passages 23a, 24a are examples of the introduction unit which introduces the water, contained in the oxidant gas flowing through the cathode discharge passage 21b, into the cathode supply passage 20a.

The ECU 1 controls the opening degree of the three-way valve 36a on the humidification passage 23a such that the water is introduced from the cathode discharge passage 21b of the second electric power generation system 9b, which is in an electric power generation state, into the cathode supply passage 20a of the first electric power generation system 9a during the refresh control. Hence, some of the oxidant gas flowing through the cathode supply passage 20a flows from the three-way valve 36a to the humidifier 35b through the humidification passage 23a, and the remaining oxidant gas is supplied from the three-way valve 36a to the fuel cell stack 10a along the cathode supply passage 20a.

The humidifier 35b humidifies at least some of the oxidant gas flowing through the cathode supply passage 20a with the water contained in the oxidant off-gas flowing through the cathode discharge passage 21b. The humidifier 35b includes a film 350b which permits water to permeate from the cathode discharge passage 21b side to the cathode supply passage 20a side. Hence, only water can move from the cathode discharge passage 21b to the cathode supply passage 20a.

The three-way valve 36a connects the humidifier 35b to the cathode supply passage 20a. The ECU 1 controls the opening degree of the three-way valve 36a on the humidification passage 23a side such that at least some of the oxidant gas flowing through the cathode supply passage 20a flows into the humidifier 35b during refresh control. Hence, the ECU 1 can regulate the amount of water supplied to the fuel cell stack 10a with the opening degree of the three-way valve 36a on the humidification passage 23a side.

Therefore, the fuel cell stack 10a can facilitate discharge of impurities with the water supplied from the cathode discharge passage 21b at the time of refresh control as in the first embodiment.

The humidification passages 23b, 24b and the three-way valve 36b of the first embodiment may additionally be connected to the humidifier 35b of the present embodiment. In that case, the ECU 1 can regulate the flow rate of the oxidant gas flowing into the humidifier 35b by controlling the opening degree of the three-way valve 36a on the humidification passage 23a side. In addition, the ECU 1 can regulate the flow rate of the oxidant off-gas flowing into the humidifier 35b by controlling the opening degree of the three-way valve 36b on the humidification passage 23b side.

Operation of ECU in First and Second Embodiments

Figure 3:
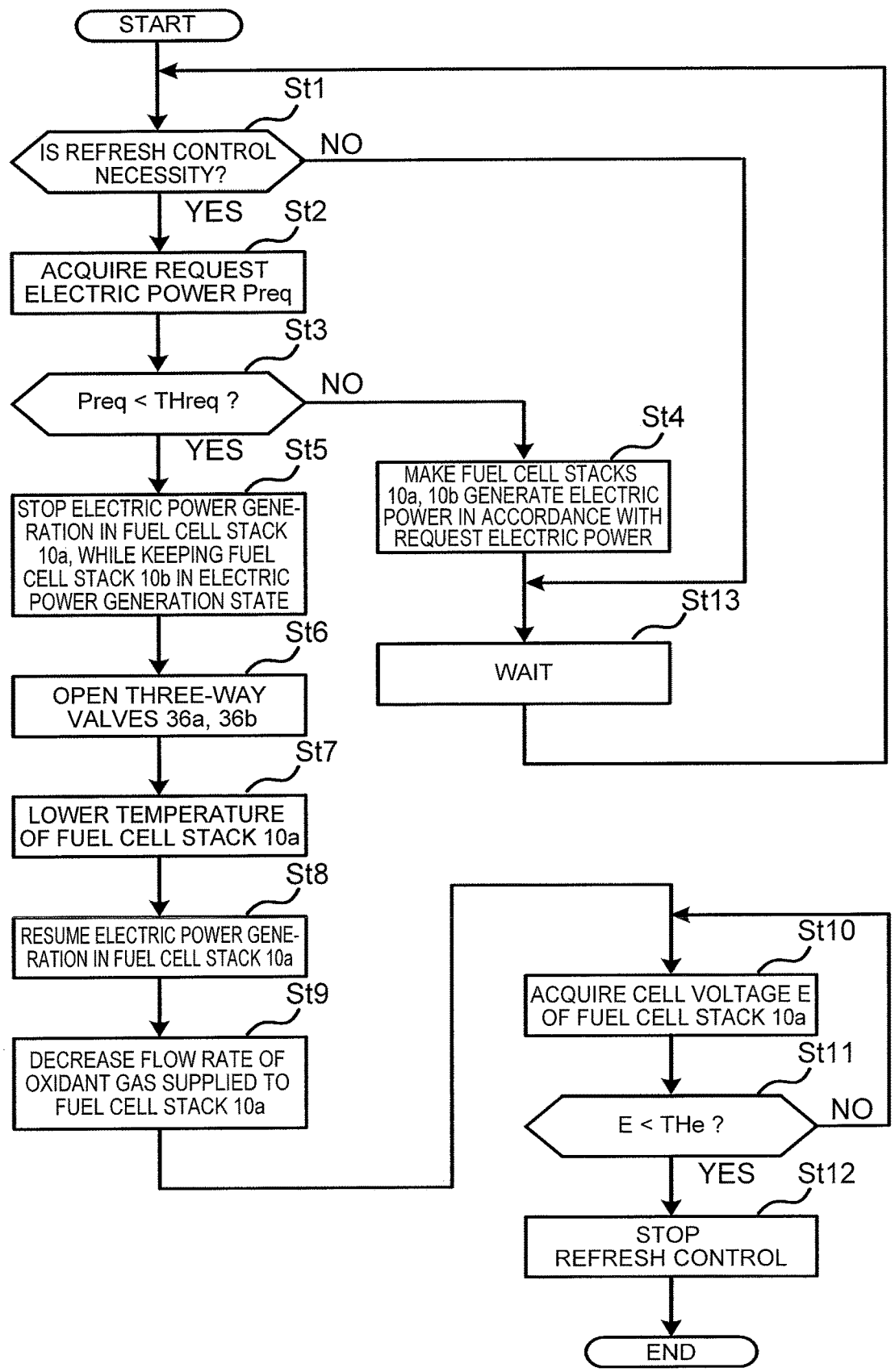
FIG. 3 is a flowchart showing an example of operation of an electric control unit (ECU) in the first and second embodiments.

FIG. 3 is a flowchart showing an example of the operation of the ECU 1 in the first and second embodiments. Before the operation, the ECU 1 is assumed to set the opening degree of the three-way valve 36b on the humidification passage 23b side and the opening degree of the three-way valve 36a on the humidification passage 23a side to zero (closed state) in order to prevent movement of water from the cathode discharge passage 21b to the cathode supply passage 20a through the humidifiers 35a, 35b. The ECU 1 is also assumed to set the switches 45a, 45b to ON state such that the fuel cell stacks 10a, 10b generate electric power.

First, the ECU 1 determines whether or not refresh control of the fuel cell stack 10a is necessary (step St1). The ECU 1 determines the necessity of the refresh control by detecting deterioration of the electric power generation performance due to oxidation of the platinum catalyst or adhesion of impurities in the fuel cell stack 10a. The deterioration of electric power generation performance is detected by, for example, comparing an actual output voltage, obtained when the fuel cell stack 10a generates electric power based on a requested prescribed electric current value, with a threshold corresponding to the electric current value. Here, the threshold may be determined based on a value obtained when the electric power generation performance of the fuel cell stack 10a is not deteriorated due to oxidation of the platinum catalyst or adhesion of impurities. For example, the thresholds corresponding to requested electric current values may be stored as a map in the ECU 1.

The ECU 1 may acquire operating time of the fuel cell stack 10a from a timer or the like, and when the operating time exceeds a prescribed time, the ECU 1 may determine that the electric power generation performance is deteriorated, and determine that the refresh control is necessary. When determining that the refresh control is not necessary (No in step St1), the ECU 1 waits for a prescribed time (for example, one second, one minute, or one hour) (step St13), and performs the processes of step St1 and subsequent steps again.

When determining that the refresh control is necessary (Yes in step St1), the ECU 1 acquires electric power (hereinafter, stated as "request electric power") Preq requested to the entire fuel cell stacks 10a, 10b (step St2). For example, the request electric power Preq is acquired from an operation amount sensor of an unillustrated accelerator pedal, or the like.

Next, the ECU 1 compares the request electric power Preq with a threshold THreq (step St3). Here, the threshold THreq is determined based on a maximum value of the electric power of the fuel cell stack 10b, for example.

When the request electric power Preq is equal to or greater than the threshold THreq (No in step St3), the ECU 1 makes each of the fuel cell stacks 10a, 10b generate electric power in conformity with the request electric power Preq (step St4). The ECU 1 controls, for example, the air compressors 30a, 30b or the DC-DC converters 40a, 40b such that a sum of the electric power generated in the fuel cell stacks 10a, 10b satisfies the request electric power Preq. Then, the ECU 1 wait for a prescribed time (step St13), and performs each of the processes of step St1 and subsequent steps again.

As described later, at the time of the refresh control, the ECU 1 lowers the flow rate of the oxidant gas which is supplied to the fuel cell stack 10a. Accordingly, the electric power of the fuel cell stack 10a becomes considerably smaller than the electric power generated when normal electric power generation is performed in step St4, and the value of the electric power becomes closer to zero. Hence, in the case where the request electric power Preq is equal to or greater than the threshold THreq (No in step St3), the ECU 1 determines that if the refresh control is performed, the request electric power Preq is not satisfied even when the fuel cell stack 10b generates electric power. Accordingly, the ECU1 performs each of the processes of step St1 and subsequent steps again, without executing the processes of step St5 and subsequent steps.

When the request electric power Preq is smaller than the threshold THreq (Yes in step St3), the ECU 1 performs each of the processes of step St5 and subsequent steps.

First, the ECU 1 stops electric power generation in the fuel cell stack 10a that is a refresh control target, while keeping the fuel cell stack 10b in an electric power generation state (step St5). At the time, the ECU 1 sets the switch 45a in OFF state to cut the electrical connection between the fuel cell stack 10a and the inverter 43. As a result, the electric load of the fuel cell stack 10a substantially disappears, and therefore electric power generation is in a stopped state. In this state, the output current of the fuel cell stack 10a becomes zero, and the voltage of the fuel cell stack 10a becomes an open-circuit voltage.

The step (step St5) of stopping electric power generation in the fuel cell stack 10a does not necessarily need to be executed. For example, the fuel cell stack 10a may be put in an idle operating state where electric power generation is continued at a relatively small constant current, instead of being put in the electric power generation stopped state, and then the processes of next step St6 and subsequent steps may be executed.

The ECU 1 also controls the flow rate of the oxidant gas supplied to the fuel cell stack 10b, by the control of the air compressor 30b, such that the electric power of the fuel cell stack 10b which is not during the refresh control satisfies the request electric power Preq. The ECU 1 further controls the flow rate of fuel gas by the control of an unillustrated injector. As a result, even when the fuel cell stack 10a stops electric power generation, the fuel cell stack 10b performs normal electric power generation. Therefore, the request electric power Preq is satisfied, and the water to be supplied to the fuel cell stack 10a that is the refresh control target is secured.

When performing the refresh control, the ECU 1 opens the three-way valves 36b, 36a such that water is introduced from the cathode discharge passage 21b to the cathode supply passage 20a through the humidifiers 35a, 35b (step St6). Thus, the fuel cell stack 10b in a normal electric power generation state supplies the water, generated through electric power generation, to the fuel cell stack 10a that is the refresh control target.

Next, the ECU 1 controls the radiator 50a or the cooling pump 51a so as to lower the temperature of the fuel cell stack 10a (step St7). For example, the ECU 1 may lower the temperature of the coolant by increasing the speed of the fan of the radiator 50a, or may increase the flow rate of the coolant by increasing the speed of the cooling pump 51a. With this, the steam in the fuel cell stack 10a changes to liquid water, and the amount of liquid water increases. Therefore, it becomes possible to wash away the impurities desorbed from the platinum catalyst more effectively at the time of the refresh control.

The process (step St7) of controlling the radiator 50a or the cooling pump 51a so as to lower the temperature of the fuel cell stack 10a does not necessarily need to be executed. Even when the temperature of the fuel cell stack 10a is not lowered, the amount of liquid water of the fuel cell stack 10a during the refresh control can be increased by introducing the water, generated through electric power generation in the fuel cell stack 10b, into the fuel cell stack 10a. Therefore, the impurities can adequately be washed away.

Next, the ECU 1 resumes electric power generation in the fuel cell stack 10a (step St8). At the time, the ECU 1 turns on the switch 45a to electrically connect the inverter 43 and the fuel cell stack 10a.

Next, the ECU 1 controls the air compressor 30a so as to control such that the flow rate of the oxidant gas supplied to the fuel cell stack 10a becomes smaller than the flow rate at the time of the normal electric power generation (step St9). More specifically, the ECU 1 controls the flow rate of oxidant gas such that a stoichiometric ratio of oxidant gas becomes smaller than one. Here, the stoichiometric ratio refers to a ratio of the flow rate of oxidant gas, actually supplied to the fuel cell stack 10a, to the flow rate of oxidant gas required for the electrochemical reaction which generates an electric current requested to the fuel cell stack 10a. At the time, since the amount of oxidant gas remaining in the fuel cell stack 10a rapidly decreases, the output voltage of the fuel cell stack 10a also rapidly falls.

Thus, the ECU 1 lowers the voltage of the fuel cell stack 10a by making the flow rate of the oxidant gas flowing through the cathode supply passage 20a smaller than the flow rate when the fuel cell stack 10a generates electric power in conformity with the request electric power Preq as in the control in step St4. Thus, the refresh control of the fuel cell stack 10a is performed.

The amount of water generated through electric power generation in the fuel cell stack 10a during the above-described refresh control decreases with a decrease of the flow rate of the oxidant gas flowing through the cathode supply passage 20a. However, since water is supplied from the fuel cell stack 10b that is in the normal electric power generation state to the fuel cell stack 10a that is during the refresh control, the fuel cell stack 10a becomes able to sufficiently wash away the impurities desorbed from the platinum catalyst.

In the case of lowering the output voltage by the control of decreasing the flow rate of oxidant gas, the amount of water generated through electric power generation in the fuel cell stack 10a becomes smaller than in the case of lowering the output voltage only by the control of increasing the output current, while supplying the flow rate of oxidant gas required for the normal electric power generation. Hence, in the case of performing the control of decreasing the flow rate of oxidant gas, the water discharged from the fuel cell stack 10b in the normal electric power generation state is supplied to the fuel cell stack 10a through the humidifiers 35a, 35b. As a result, the effect of washing away the impurities generated at the time of the refresh control becomes more prominent.

Next, the ECU 1 acquires a cell voltage E of the fuel cell stack 10a from the voltage sensor 6a (step St10). At the time, the ECU 1 may acquire, as the cell voltage E, an average of the cell voltages of the respective fuel cells in the fuel cell stack 10a, for example.

Next, in order to determine completion of the refresh control, the ECU 1 compares the cell voltage E with a prescribed refresh voltage THe that is required for refresh control (step St11). When the cell voltage E is equal to or greater than the refresh voltage THe (No in step St11), the ECU 1 determines that the refresh control is incomplete, and executes each of the processes of step St10 and subsequent steps again.

When the cell voltage E is smaller than the refresh voltage THe (Yes in step St11), the ECU 1 determines that the refresh control is completed, and stops the refresh control (step St12). At the time, the ECU 1 returns the opening degrees of the three-way valves 36a, 36b, and the supply amount of the oxidant gas to the fuel cell stack 10a, to the values before step St5.

Thus, the ECU 1 is operated. When the time required until the cell voltage E reaches the refresh voltage THe during the refresh control is available, the ECU 1 may determine whether or not a prescribed time elapses after the completion of the process of step St9, in place of the determination process of step St11.

Another Operation of ECU in First and Second Embodiments

The ECU 1 may perform the refresh control by increasing the output current of the fuel cell stack 10a, while maintaining the oxidant gas supplied to the fuel cell stack 10a at the flow rate in conformity with the request electric power Preq, unlike the above-described operation.

Figure 4:
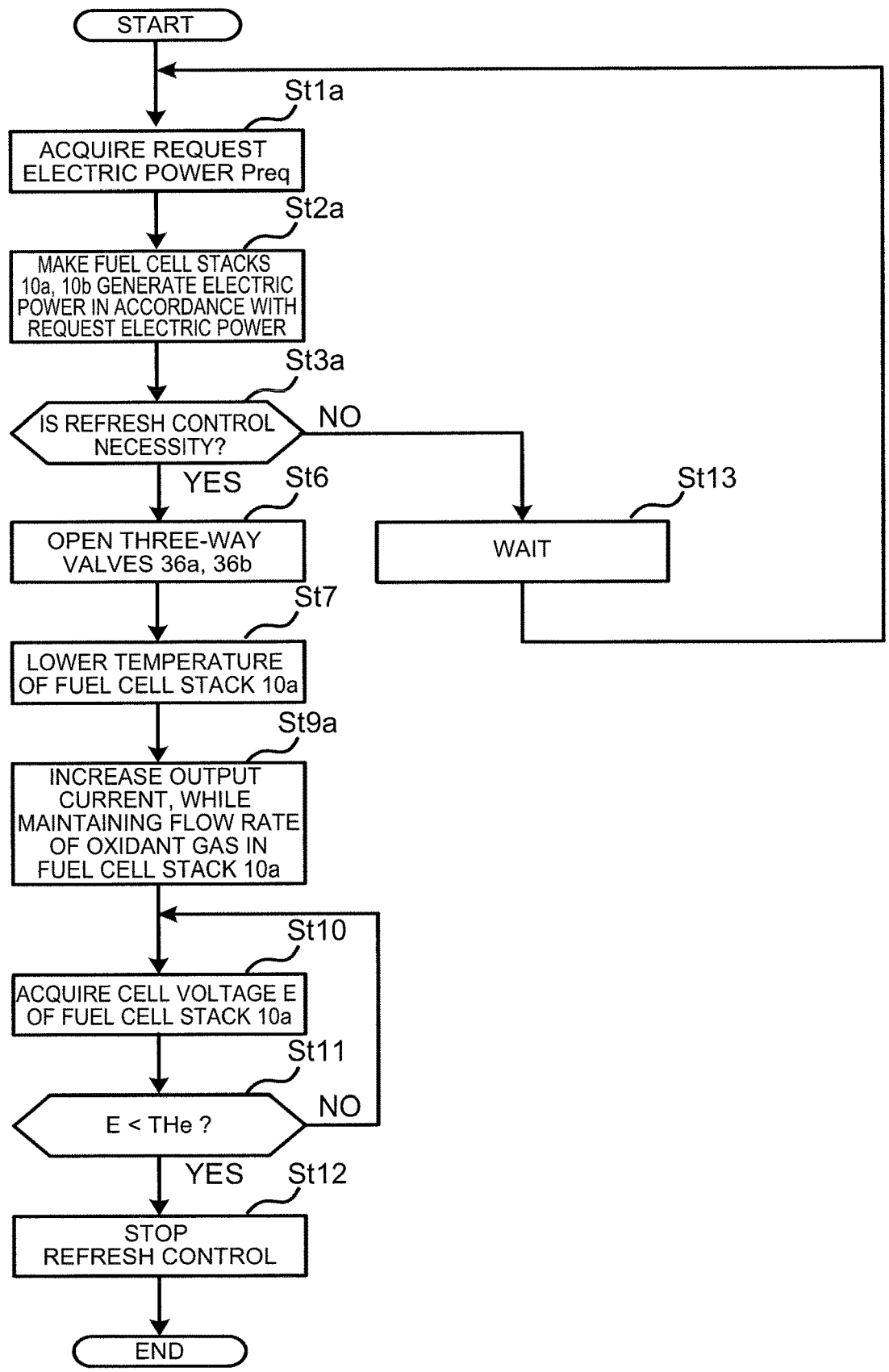
FIG. 4 is a flowchart showing another operation of the ECU in the first and second embodiments.

FIG. 4 is a flowchart showing another example of the operation of the ECU 1 in the first and second embodiments. In FIG. 4, processes identical to those in FIG. 3 are designated by identical reference signs to omit the description thereof.

Before the operation, the ECU 1 is assumed to set the opening degrees of the three-way valves 36b, 36a on the humidification passages 23b, 23a sides to zero (closed state) so as to prevent movement of water from the cathode discharge passage 21b to the cathode supply passage 20a through the humidifiers 35a, 35b, respectively. The ECU 1 is also assumed to set the switches 45a, 45b to ON state such that the fuel cell stacks 10a, 10b generate electric power.

First, the ECU 1 acquires a request electric power Preq of the entire fuel cell stacks 10a, 10b (step St1a). Next, the ECU 1 makes each of the fuel cell stacks 10a, 10b generate electric power in conformity with the request electric power Preq (step St2a). The ECU 1 controls, for example, the air compressors 30a, 30b or the DC-DC converters 40a, 40b such that a sum of the electric power generated in the fuel cell stacks 10a, 10b satisfies the request electric power Preq.

Then, the ECU 1 determines whether or not the refresh control of the fuel cell stack 10a is necessary (step St3a). The determination is performed by the same method as the determination in step St1 described before. When determining that the refresh control is not necessary (No in step St3a), the ECU 1 waits for a prescribed time (step St13), and performs each of the processes of step St1a and subsequent steps again.

When determining that the refresh control is necessary (Yes in step St3a), the ECU 1 executes the processes of steps St6, St7 described before.

Next, the ECU 1 increases the output current of the fuel cell stack 10a, while maintaining the oxidant gas supplied to the fuel cell stack 10a at the flow rate at the time of the normal electric power generation in step St2a (step St9a). At the time, the ECU 1 increases the output current of the fuel cell stack 10a by electrically controlling the DC-DC converter 40a, for example. As the output current increases, the output voltage of the fuel cell stack 10a decreases in accordance with current-voltage characteristics in the case where the amount of oxidant gas is large. Accordingly, the output voltage of the fuel cell stack 10a becomes less than the refresh voltage THe.

Because of the increase in the output current of the fuel cell stack 10a, the electric power generated in the fuel cell stack 10a becomes larger than the electric power generated in the normal electric power generation in step St2a. At the time, the ECU 1 controls, for example, the air compressor 30b so as to decrease the electric power generated in the fuel cell stack 10b which performs normal electric power generation. As a result, the ECU 1 can regulate such that a sum of the electric power of the fuel cell stacks 10a, 10b becomes the request electric power Preq. Here, when the request electric power Preq is small, the sum of the electric power generated in the fuel cell stacks 10a, 10b may exceed the request electric power Preq. In this case, an exceeded portion of the electric power, which exceeds the request electric power Preq, may be stored in the batteries 42a, 42b.

Then, the ECU 1 executes each of the processes of steps St10 to St12. Thus, the ECU 1 is operated.

Configuration of Fuel Cell System of Third Embodiment

In the first and second embodiments, the water generated through electric power generation in the fuel cell stack 10b moves from the cathode discharge passage 21b to the cathode supply passage 20a through the humidifiers 35a, 35b. However, the water may be moved from the cathode discharge passage 21b to the cathode supply passage 20a by a pump.

Figure 5:
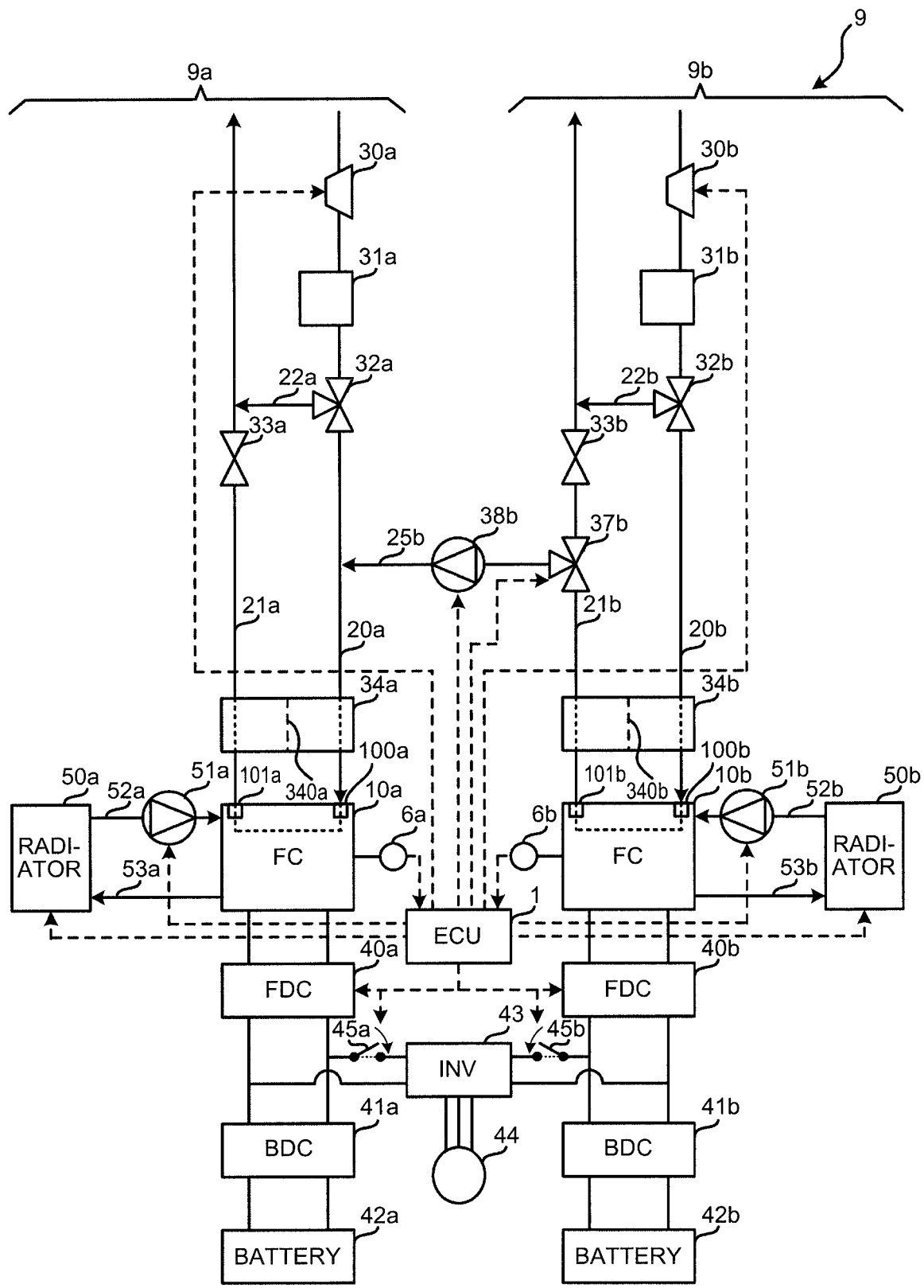
FIG. 5 is a block diagram of the fuel cell system of a third embodiment.

FIG. 5 is a block diagram showing the fuel cell system 9 of a third embodiment. In FIG. 5, component members identical to those in FIG. 1 are designated by identical reference signs to omit the description thereof.

The fuel cell system 9 of the present example includes a relay pump 38b, a three-way valve 37b, and a relay passage 25b, instead of the humidifier 35a, the three-way valve 36b, and the humidification passages 23b, 24b in the first embodiment. The three-way valve 37b is connected to a portion of the cathode discharge passage 21b, the portion being located on the upstream side of the backpressure valve 33b and the downstream side of the humidifier 34b. The ECU 1 controls an opening degree of the three-way valve 37b on the relay passage 25b side.

The relay passage 25b has one end connected to the three-way valve 37b, and the other end connected to the cathode supply passage 20a. The relay pump 38b is an example of the pump, which is provided on the relay passage 25b. The relay pump 38b, the three-way valve 37b, and the relay passage 25b are examples of the introduction unit which introduces the water, contained in oxidant off-gas flowing through the cathode discharge passage 21b, into the cathode supply passage 20a.

At least some of oxidant off-gas flowing through the cathode discharge passage 21b flows to the relay passage 25b in accordance with the opening degree of the three-way valve 37b on the relay passage 25b side. The relay pump 38b is driven under the control of the ECU 1 to pump out the oxidant off-gas to the cathode supply passage 20a. Since the oxidant off-gas contains water generated through electric power generation in the fuel cell stack 10b, the water in the oxidant off-gas is introduced from the cathode supply passage 20a into the fuel cell stack 10a.

Thereby, the fuel cell stack 10a can facilitate discharge of the impurities which are desorbed from the platinum catalyst at the time of the refresh control.

Since the ECU 1 drives the relay pump 38b during the refresh control of the fuel cell stack 10a, the whole oxidant off-gas containing water, instead of only the water, is supplied to the fuel cell stack 10a, unlike the first and second embodiments. Hence, the fuel cell stack 10a generates electric power with low-concentration oxygen in the oxidant off-gas.

At that time, the ECU 1 can make the fuel cell stack 10a generate electric power only with the low-concentration oxygen from the cathode supply passage 20a by stopping the operation of the air compressor 30a during the refresh control. In this case, the electric power generated in the fuel cell stack 10a becomes lower than before the operation of the air compressor is stopped. Accordingly, the output voltage of the fuel cell stack 10a can easily be lowered to the refresh voltage THe that is required for refresh control. Since the relay pump 38b is driven even when the air compressor 30a is stopped, the oxidant off-gas can flow from the cathode discharge passage 21b to the fuel cell stack 10a.

Operation of ECU in Third Embodiment

Figure 6:
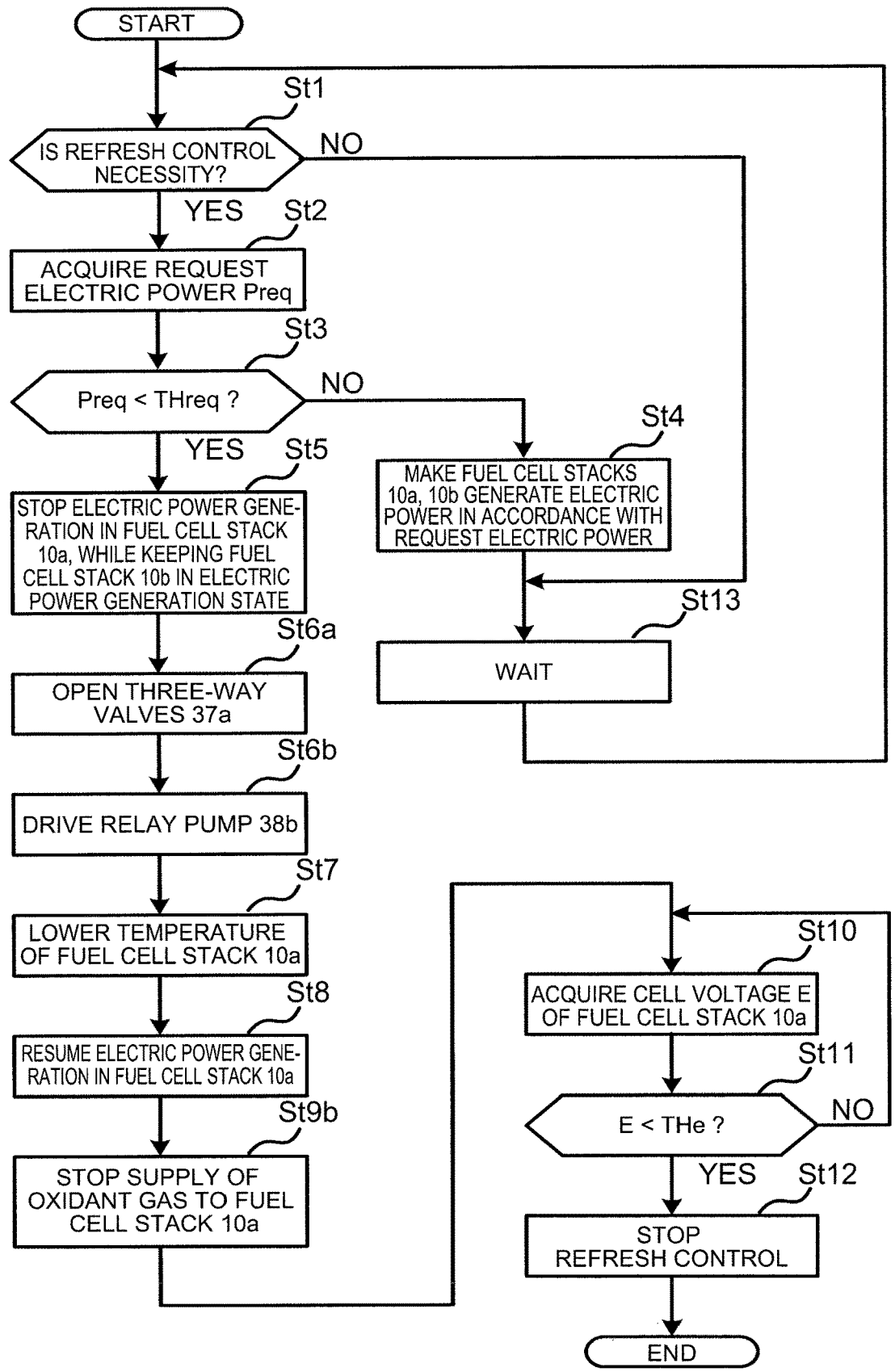
FIG. 6 is a flow chart showing an example of the operation of the ECU in the third embodiment.

FIG. 6 is a flow chart showing an example of the operation of the ECU 1 at the time of refresh control in the third embodiment. In FIG. 6, processes identical to those in FIG. 3 are designated by identical reference signs to omit the description thereof. Before the process, the ECU 1 is assumed to stop the relay pump 38b so as to prevent water from moving from the cathode discharge passage 21b to the cathode supply passage 20a through the relay pump 38b, and set the opening degree of the three-way valve 37b on the relay passage 25b side to zero. The ECU 1 is also assumed to set the switches 45a, 45b to ON state such that the fuel cell stacks 10a, 10b generate electric power.

After the process of step St5, the ECU 1 opens the three-way valve 37b such that water is introduced from the cathode discharge passage 21b to the cathode supply passage 20a through the relay pump 38b (step St6a). Consequently, some of oxidant off-gas flowing through the cathode discharge passage 21b flows to the relay passage 25b in accordance with the opening degree of the three-way valve 37b on the relay passage 25b side. The ECU 1 can regulate the flow rate of the oxidant off-gas flowing to the relay passage 25b by controlling the opening degree of the three-way valve 37b.

Next, the ECU 1 drives the relay pump 38b (step St6b). With this, the oxidant off-gas is introduced from the relay passage 25b to the cathode supply passage 20a.

After the process of step St8, the ECU 1 stops supply of the oxidant gas to the fuel cell stack 10a that is the refresh control target (step St9b). At the time, the ECU 1 stops the operation of the air compressor 30a. Hence, only the oxidant off-gas from the fuel cell stack 10b in the normal electric power generation state is supplied to the fuel cell stack 10a through the cathode supply passage 20a, and the fuel cell stack 10a generates electric power with low-concentration oxygen in the oxidant off-gas.

Therefore, the fuel cell stack 10a generates electric power with an insufficient amount of oxidant gas, so that the output voltage lowers, as in the case where the flow rate of oxidant gas decreases as shown in step St9 of the first embodiment.

The amount of water generated through electric power generation in the fuel cell stack 10a decreases due to the stop of oxidant gas supply. However, since the water in the oxidant off-gas is supplied from the fuel cell stack 10b that is in the normal electric power generation state to the fuel cell stack 10a that is during the refresh control, the fuel cell stack 10a becomes able to sufficiently wash away the impurities desorbed from the platinum catalyst.

Modification of Fuel Cell System of Third Embodiment

It has been described that the refresh control is performed on the fuel cell stack 10a in the first electric power generation system 9a, while the water generated through electric power generation in the fuel cell stack 10b of the second electric power generation system 9b is introduced to the fuel cell stack 10a. In addition to the above configuration, the refresh control may be performed on the fuel cell stack 10b in the second electric power generation system 9b, while the water generated through electric power generation in the fuel cell stack 10a of the first electric power generation system 9a is introduced to the fuel cell stack 10b. In this case, the fuel cell system 9 is further provided with component members for introducing oxidant off-gas from the cathode discharge passage 21a of the first electric power generation system 9a into the cathode supply passage 20b of the second electric power generation system 9b.

Figure 7:
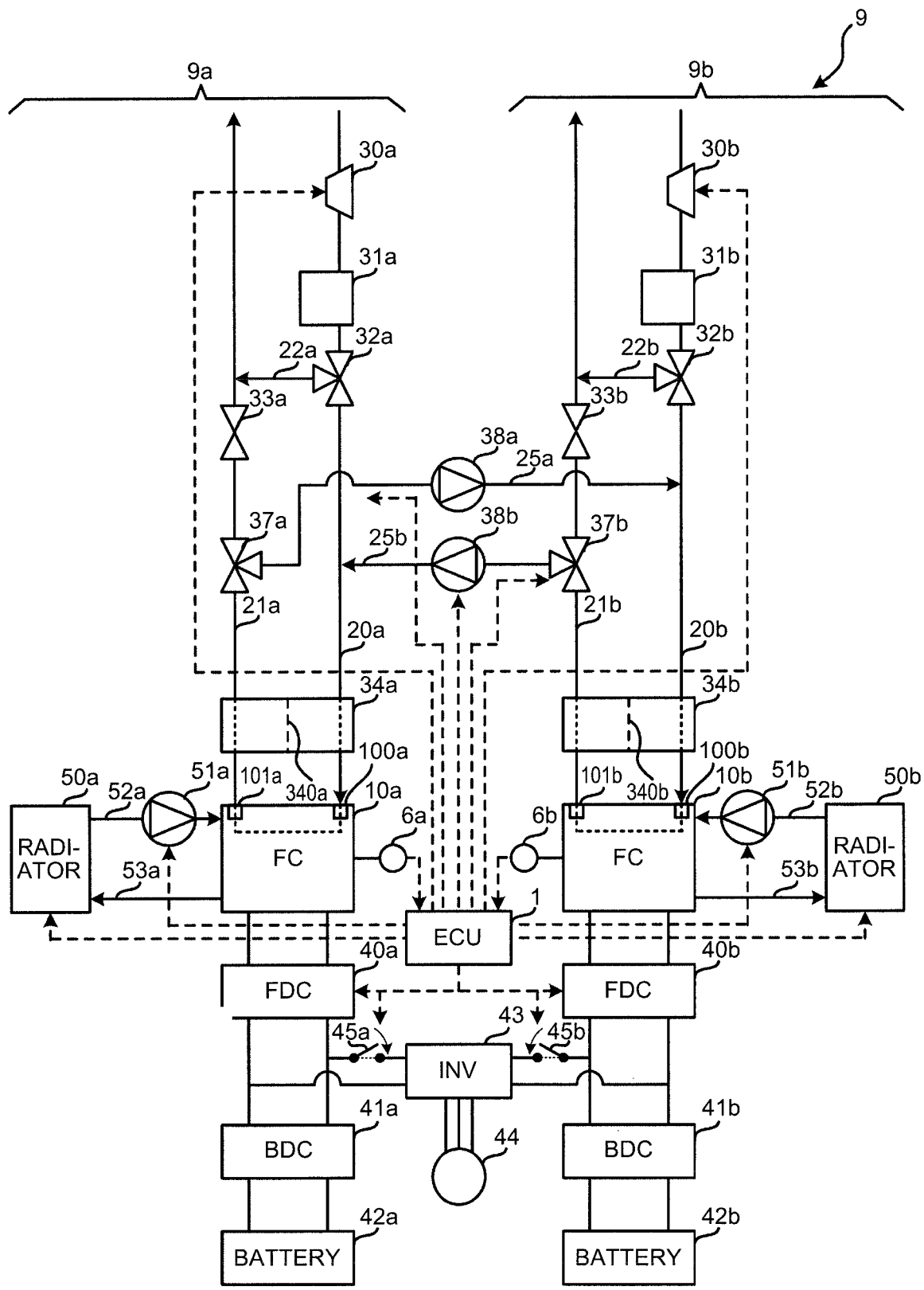
FIG. 7 is a block diagram showing a modification of the fuel cell system of the third embodiment.

FIG. 7 is a block diagram showing a modification of the fuel cell system 9 of the third embodiment. In FIG. 7, component members identical to those in FIG. 5 are designated by identical reference signs to omit the description thereof.

In addition to the configuration of FIG. 5, the fuel cell system 9 includes a relay pump 38a, a three-way valve 37a, and a relay passage 25a. The three-way valve 37a is connected to a portion of the cathode discharge passage 21a, the portion being located on the upstream side of the backpressure valve 33a and the downstream side of the humidifier 34a. The ECU 1 controls an opening degree of the three-way valve 37a on the relay passage 25a side.

The relay passage 25a has one end connected to the three-way valve 37a, and the other end connected to the cathode supply passage 20b. The relay pump 38a is provided on the relay passage 25a. The relay pump 38a, the three-way valve 37a, and the relay passage 25a introduce the water, contained in oxidant off-gas flowing through the cathode discharge passage 21a, into the cathode supply passage 20b.

As in the configuration described before, the ECU 1 controls the opening degree of the three-way valve 37a on the relay passage 25a side during refresh control of the fuel cell stack 10b, and drives the relay pump 38a. Hence, the oxidant off-gas flows through the cathode discharge passage 21a and then through the relay passage 25a, and is introduced into the cathode supply passage 20b. The oxidant off-gas is then introduced from the cathode supply passage 20b into the fuel cell stack 10b. As a consequence, the fuel cell stack 10b can facilitate discharge of the impurities which are desorbed from the platinum catalyst at the time of the refresh control, with use of the water contained in the oxidant off-gas.

The humidifier 35a, the three-way valve 36b, and the humidification passages 23b, 24b in the first embodiment, or the humidifier 35b, the three-way valve 36a, and the humidification passages 23a, 24a in the second embodiment, may also be added such that the water in the oxidant off-gas flowing through the cathode discharge passage 21a is introduced into the cathode supply passage 20a as in the present example. In the fuel cell system 9, the cathode discharge passages 21a, 21b may be equipped with a gas-liquid separator. In this case, the water in the oxidant off-gas flowing through the cathode discharge passages 21a, 21b is taken out as liquid water from the oxidant off-gas by the gas-liquid separator, and the liquid water is introduced into the cathode supply passages 20b, 20a with a humidifier or a pump described before.

The embodiments disclosed are preferable embodiments of the present disclosure. However, the present disclosure is not limited to the embodiments disclosed, and various modifications may be made without departing from the scope of the disclosure.

What is claimed is:

1. A fuel cell system, comprising:
a first fuel cell stack and a second fuel cell stack each configured to generate electric power through chemical reaction between fuel gas and oxidant gas;
a supply passage connected to an inlet of the oxidant gas in the first fuel cell stack;
a discharge passage connected to an outlet of the oxidant gas in the second fuel cell stack;
an introduction unit configured to introduce water in the oxidant gas flowing through the discharge passage into the supply passage; and
a controller configured to perform refresh control of the first fuel cell stack by lowering voltage of the first fuel cell stack, and operate, during the refresh control, the introduction unit while keeping the second fuel cell stack in an electric power generation state.

2. The fuel cell system according to claim 1, wherein when performing the refresh control, the controller is configured to lower the voltage of the first fuel cell stack by setting a flow rate of the oxidant gas flowing through the supply passage to be lower than the flow rate of the oxidant gas in a case of making the first fuel cell stack generate the electric power in accordance with electric power requested to the first fuel cell stack and the second fuel cell stack.

3. The fuel cell system according to claim 1, wherein the introduction unit includes a humidifier including a film configured to permit the water to permeate from a discharge passage side to a supply passage side.

4. The fuel cell system according to claim 3, wherein:
the introduction unit includes a first control valve configured to connect the humidifier to the discharge passage, and
the controller is configured to control an opening degree of the first control valve such that at least some of the oxidant gas flowing through the discharge passage flows to the humidifier during the refresh control.

5. The fuel cell system according to claim 3, wherein:
the introduction unit includes a second control valve configured to connect the supply passage to the humidifier, and
the controller is configured to control an opening degree of the second control valve such that at least some of the oxidant gas flowing through the supply passage flows to the humidifier during the refresh control.

6. The fuel cell system according to claim 1, wherein:
the introduction unit includes a pump configured to pump out the oxidant gas flowing through the discharge passage to the supply passage, and
the controller is configured to drive the pump during the refresh control.

7. The fuel cell system according to claim 6, comprising an air compressor configured to supply the oxidant gas to the first fuel cell stack, the air compressor being provided on an upstream side of the introduction unit in the supply passage, wherein
the controller is configured to stop operation of the air compressor during the refresh control.

8. The fuel cell system according to claim 1, comprising a cooling device configured to supply a cooling medium configured to cool the first fuel cell stack to the first fuel cell stack, wherein
the controller is configured to control the cooling device so as to increase a supply amount of the cooling medium, or so as to lower temperature of the cooling medium during the refresh control.

* * * * *